United States Patent Office 2,988,486
Patented June 13, 1961

2,988,486
COSMETIC PREPARATION
Edward Joseph Masters, Westbury, Herbert John Spoor, Malba, and Julius Wetterhahn, Flushing, N.Y., assignors to Helena Rubinstein, Inc., New York, N.Y.
No Drawing. Filed Jan. 31, 1958, Ser. No. 712,290
10 Claims. (Cl. 167—91)

This invention relates to cosmetic preparations, and more specifically, concerns cosmetic bases such as creams, emulsions, or oils which contain a combination of estrogenic hormones and progesterone as the active ingredients thereof.

In preparing cosmetic preparations for the care and treatment of the human skin it has been a desideratum to imbue such preparations with the property of stimulating the secretion of the natural oils of the skin. However, known cosmetic formulations fall far short of such objective, particularly when such applications are used by individuals of advanced years who have what is known as a dry skin condition.

Accordingly, an object of this invention is to provide a cosmetic preparation for the treatment and care of the human skin, which includes as ingredients thereof, materials having the property of stimulating the normal secretion of natural oils in the skin.

A further object of this invention is to utilize as active ingredients in a skin cream, emulsion or oil, a combination of materials which have a synergistic action in respect to the stimulation of secretion of natural oils from the sebaceous glands.

Other objects of this invention will in part be obvious and in part hereinafter pointed out.

It has been found that conventional skin treating creams which contain estrogenic hormones have little effect, if any, in increasing the secretions of natural oils in the human skin, and in some cases, actually decreases the amount of surface oil on the skin, as compared with a cream having no estrogenic hormone content. On the other hand, preparations containing the hormone progesterone produce a slight increase in the secretion of natural oils in some cases.

However, upon combining the estrogenic hormones with progesterone, the cream, emulsion or oil containing such combination, upon application to the skin, shows a very substantial increase in the amount of natural oil appearing on the skin surface. Furthermore, it was found that excellent results were obtained when about 10,000 international units of estrogenic hormones and about 5 mg. of progesterone were incorporated in each ounce of cream, emulsion or oil preparation. However, the amounts of these materials could be varied to incorporate from 2,000 to 50,000 international units of estrogenic hormones and from 1 to 25 mg. of progesterone in each ounce of cream, emulsion or oil, and obtain good results.

In preparing a cosmetic formulation in accordance with the instant invention, any suitable cosmetic base of the cream, emulsion or oil type may be used, which will keep the hormones and progesterone in solution. The base may be in emulsified form including waxes, oils, emollients, preservatives and humectants, or may be in the form of a vegetable oil, or mixture of vegetable and mineral oils.

The invention is illustrated in the following examples:

*Example I*

| | | |
|---|---|---|
| Paraffin wax 138/40 | pounds | 4 |
| Ceresin | do | 5 |
| Stearic acid | do | 1 |
| Cholesterol absorption base | do | 4 |
| Petrolatum | do | 32 |
| Lanolin | do | 6 |

*Example I—Continued*

| | | |
|---|---|---|
| Vegetable oil | pounds | 12 |
| Mineral oil | do | 6 |
| Propylene glycol | do | 3 |
| Water | do | 27 |

Perfume oil q.s. (approximately 0.1 pound).

| | | |
|---|---|---|
| Natural estrogenic hormones | grams | 0.32 |
| Progesterone, U.S.P. | do | 1.60 |

The preferred source of the estrogenic hormones is pregnant mares' urine and contains mainly estrone and a small amount of estradiol. The potency of such material is about 10,000,000 international units per gram. Estrone, U.S.P., of other origin can also be used. The preferred grade of progesterone is Progesterone, U.S.P.

The estrogenic hormones and progesterone are dissolved in the vegetable oil, which may be sweet almond or sesame oil, by heating and stirring. The oil solution is then mixed with the paraffin wax, ceresin, stearic acid, cholesterol absorption base, petrolatum, lanolin and mineral oil, with agitation and heating to a temperature of about 75° C. The propylene glycol is separately added to the water which is then heated to 75° C., the solution then being added slowly to the mixture of oils and waxes, also at the same temperature, with constant slow stirring. The batch is then cooled with continued stirring, to 40° C. when the perfume oil is added and stirred in. The entire batch is then put through a colloid mill. Stainless steel kettles provided with a heating jacket and agitators are suitable for the production of the indicated formulation.

*Example II*

The formulation is made as in Example I, except that the natural estrogenic hormones are used in an amount of 1.6 grams, and the progesterone in an amount of 8.0 grams. The method of combining the several ingredients follows the procedure outlined in Example I.

*Example III*

The formulation is made as in Example I, except that the natural estrogenic hormones are used in the amount of 8.0 grams and the progesterone in an amount of 40.0 grams.

Thus, in Example I, the estrogenic hormones have a concentration of about 2,000 I.U. per ounce of preparation and the progesterone a concentration of about 1.0 mg. per ounce. In Example II, the concentrations of said ingredients are respectively, 10,000 I.U. per ounce and 5.0 mg. per ounce; while in Example III, the concentrations are respectively 50,000 I.U. per ounce and 25 mg. per ounce.

*Example IV*

| | |
|---|---|
| Beeswax | 3 pounds. |
| Ozokerite | 3 pounds. |
| Stearic acid | 1 pound. |
| Ceresin | 3 pounds. |
| Cholesterol absorption base | 2 pounds. |
| Lanolin | 3 pounds. |
| Lanolin ester | 5 pounds. |
| Petrolatum | 20 pounds. |
| Mineral oil | 15 pounds. |
| Sweet almond oil | 5 pounds. |
| Propylparahydroxybenzoate | 0.2 pound. |
| Sorbitol solution (70%) | 4.0 pounds. |
| Water | 35.8 pounds. |
| Perfume oil | About 0.1 pound. |
| Natural estrogenic hormones | 0.32 gram. |
| Progesterone, U.S.P. | 1.60 grams. |

The natural estrogenic hormones and progesterone are dissolved in the sweet almond oil with heating and stirring. This solution is added to the beeswax, ozokerite, stearic acid, ceresin, cholesterol absorption base, lanolin, lanolin ester, petrolatum, mineral oil and propylparahydroxybenzoate preservative, heated together with agitation at 75° C. The sorbitol solution is separately added to the water and heated to the same temperature, and added slowly to the waxes and oils with constant slow stirring at the same temperature.

The batch is then cooled while stirring, to 40° C. at which point the perfume oil is added and stirred in. The entire batch is put through a colloid mill.

The formulation of Example IV may be varied by changing the amounts of natural estrogenic hormones and progesterone as by using 1.6 grams of hormone and 8.0 grams of progesterone in one case; and 8.0 grams of hormone and 40.0 grams of progesterone in another case.

*Example V*

| | |
|---|---|
| Vegetable oil | 100 pounds. |
| Perfume oil | About 0.1 pound. |
| Natural estrogenic hormones | 0.32 gram. |
| Progesterone, U.S.P | 1.60 grams. |

The hormones and progesterone are dissolved in a small portion of the vegetable oil, which may be sweet almond oil, sesame oil, or the like; by heating, accompanied by stirring. The oil solution is then mixed with the remainder of the oil with stirring, followed by the addition of the perfume oil.

The foregoing example may also be varied by increasing the proportionate amounts of natural estrogenic hormones and progesterone, as indicated in the previous examples.

*Example VI*

| | |
|---|---|
| Mineral oil | 30 pounds. |
| Isopropyl palmitate | 20 pounds. |
| Vegetable oil | 46.8 pounds. |
| Lanolin ester | 3 pounds. |
| Propylparahydroxybenzoate | 0.2 pound. |
| Perfume oil | About 0.1 pound. |
| Natural estrogenic hormones | 0.32 gram. |
| Progesterone, U.S.P | 1.60 grams. |

The natural estrogenic hormones and progesterone are dissolved in a portion of the vegetable oil, which may be sesame or sweet almond oil; by heating and stirring. The mineral oil, isopropyl palmitate, lanolin ester and the remainder of the vegetable oil are mixed together to form a uniform mixture. The oil solution of hormones and progesterone, together with the propylparahydroxybenzoate and perfume oil, are then mixed with the mineral oil mixture, with agitation.

In the foregoing formulation, the proportions of natural estrogenic hormone, and progesterone may also be increased by using 1.6 grams of the former and 8.0 grams of the latter, in one case; and 8.0 grams of the former and 40.0 grams of the latter in another case.

Upon testing the preparation of the instant invention to determine the natural oil secretion on various portions of the facial skin of a female, as compared with that attained with either no cream application, a base cream having no hormones, and a base cream containing estrogenic hormones only; the increase in oil secretion upon use of the estrogenic hormone-progesterone containing creams varied from about 25 to 50% in the cheek areas over the other creams. In the case of chin areas, the increase in oil secretion using the preparation of the invention amounted to about 50 to 55% over the other creams.

In making the foregoing and other confirmatory tests, the special osmic acid staining technique was used, which measured natural oil both on and beneath the skin surface in a manner known in the art.

Various changes and modifications may be made without departing from the spirit and scope of the present invention and it is intended that such obvious changes and modifications be considered within the purview of the annexed claims.

What is claimed is:

1. Method of stimulating the secretion of natural oils from the sebaceous glands of human skin which comprises applying topically thereto a preparation comprising a base and a mixture for stimulating the secretion of natural oils from the sebaceous glands consisting essentially of estrogenic hormone and progesterone, the concentration of estrogenic hormone varying from 2000 to 50,000 international units and the concentration of progesterone varying from 1 to 25 mg. per ounce of said preparation, said concentration being sufficient to stimulate said secretion of oils, said preparation being characterized by having a synergistic action in stimulating said secretion owing to the presence of both said estrogenic hormone and said progesterone.

2. A preparation for stimulating the secretion of natural oils from the sebaceous glands of human skin by topical application thereto comprising a base and a mixture for stimulating the secretion of natural oils from the sebaceous glands consisting essentially of estrogenic hormone and progesterone, the concentration of estrogenic hormone varying from 2,000 to 50,000 international units and the concentration of progesterone varying from 1 to 25 mg. per ounce of said preparation, said concentrations being sufficient to stimulate said secretion of oils, and said preparation being characterized by having a synergistic action in stimulating said secretion owing to the presence of said estrogenic hormone and said progesterone.

3. Method of stimulating the secretion of natural oils from the sebaceous glands of human facial skin which comprises applying topically to said skin a cosmetic preparation comprising a cosmetic base incorporating a mixture of estrogenic hormones and progesterone, the concentration of estrogenic hormones varying from 2,000 to 50,000 international units as the concentration of progesterone varies from 1 to 25 mg. per ounce of said preparation, said concentrations being sufficient to stimulate secretion of oils, said preparation being characterized by having a synergistic action in stimulating said secretion owing to the presence of said estrogenic hormones and said progesterone.

4. The method of claim 3 wherein said mixture of estrogenic hormones comprises a naturally derived mixture of a major portion of estrone and a minor portion of estradiol.

5. The method of claim 4 wherein said estrogenic hormones are present in a concentration of about 10,000 international units per ounce of preparation and said progesterone is present in a concentration of about 5 mg. per ounce of preparation.

6. Method of stimulating the secretion of natural oils from the sebaceous glands of human skin which comprises applying topically thereto a preparation comprising a base incorporating an estrogenic hormone and progesterone, the concentration of estrogenic hormone varying from 2,000 to 50,000 international units and the concentration of progesterone varying from 1 to 25 mg. per ounce of said preparation, said concentrations being sufficient to stimulate said secretion of oils, said preparation being characterized by having a synergistic action in stimulating said secretion owing to the presence of both said estrogenic hormone and said progesterone.

7. The preparation of claim 2 wherein said estrogenic hormone comprises a naturally derived mixture of a major portion of estrone and a minor portion of estradiol.

8. The preparation of claim 2 wherein said estrogenic hormone is present in a concentration of about 10,000 international units per ounce of preparation and said progesterone is present in a concentration of about 5 mg. per ounce of preparation.

9. The method of claim 6, wherein said estrogenic hormone and said progesterone are present in the preparation in a proportion of about 1 part by weight of said estrogenic hormone to about 5 parts by weight of said progesterone.

10. The preparation of claim 2, wherein said estrogenic hormone and said progesterone are present in a proportion of about 1 part by weight of the estrogenic hormone to about 5 parts by weight of said progesterone.

References Cited in the file of this patent

Sagarin: Cosmetics, Sci. & Tech., Interscience Pub., N.Y., 1957, pp. 182–188, 1232–1243.

Czetsch-Lindenwald: Salben, Puder, Externa, Springer-Verlag Berlin, 3rd ed., 1950, page 183.

Modern Drug Encyclopedia, Drug Publications Inc., 6th ed., 1955, pp. 255, 399, 420, 865, 939.

Zondek: The Lancet, May 14, 1938, pp. 1107–1110.

Wells: The Amer. Perfumer & Ess. Oil Review, 61: 1, January 1953, pp. 19, 21–23.

J.A.M.A., 164: 4, May 25, 1957, pp. 412–416.